(12) United States Patent
Wears

(10) Patent No.: US 7,721,753 B2
(45) Date of Patent: May 25, 2010

(54) APPARATUS TO CONNECT A VALVE STEM TO A VALVE PLUG

(75) Inventor: William E. Wears, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 374 days.

(21) Appl. No.: 11/880,529

(22) Filed: Jul. 23, 2007

(65) Prior Publication Data
US 2009/0025795 A1   Jan. 29, 2009

(51) Int. Cl.
*F16K 5/00* (2006.01)
(52) U.S. Cl. .................... 137/315.27; 251/366
(58) Field of Classification Search ............ 137/315.27, 137/315.28, 15.24; 251/366
See application file for complete search history.

(56) References Cited
U.S. PATENT DOCUMENTS

| | | | |
|---|---|---|---|
| 3,101,210 A | | 8/1963 | Johnson |
| 3,572,633 A | * | 3/1971 | Gaffney ........................ 251/356 |
| 3,648,718 A | * | 3/1972 | Curran ................... 137/315.27 |
| 4,134,606 A | * | 1/1979 | Menti, Jr. .................... 285/21.1 |
| 4,676,528 A | * | 6/1987 | Gray ............................ 285/15 |
| 4,705,062 A | * | 11/1987 | Baker ..................... 137/315.02 |
| 5,201,335 A | | 4/1993 | Osgood et al. |

OTHER PUBLICATIONS

International Bureau, International Search Report for International Application No. PCT/US2008/070662, Dec. 4, 2008, 4 pages.
International Bureau, Written Opinion for International Application No. PCT/US2008/070662, Dec. 4, 2008, 5 pages.
U.S. Appl. No. 11/711,428, Filed Feb. 27, 2007, Inventor Leslie E. Fleming.
U.S. Appl. No. 11/844,167, Filed Aug. 23, 2007, Inventor Dennis Eugene O'Hara.

* cited by examiner

*Primary Examiner*—Kevin L Lee
(74) *Attorney, Agent, or Firm*—Hanley, Flight & Zimmerman, LLC

(57) ABSTRACT

Apparatus to connect a valve stem to a valve plug and, more particularly, apparatus to connect a threaded valve stem to a valve plug of a control valve are disclosed. An example apparatus includes a threaded valve stem received in a threaded opening of a valve plug and a securement member received in an adjacent opening extending from at least one of the threaded opening or an exterior surface of the valve stem to secure non-rotatably the threaded valve stem to the valve plug.

19 Claims, 5 Drawing Sheets

APPARATUS TO CONNECT A VALVE STEM TO A VALVE PLUG

FIELD OF THE DISCLOSURE

This disclosure relates generally to apparatus to connect a valve stem to a valve plug and, more particularly, to apparatus to connect a threaded valve stem to a valve plug of a control valve.

BACKGROUND

Processing plants use control valves in a wide variety of applications such as, for example, controlling product flow in a food processing plant, maintaining fluid levels in large tank farms, etc. Automated control valves are used to manage the product flow or to maintain the fluid levels by functioning like a variable passage. The amount of fluid flowing through a valve body of the automated control valve can be accurately controlled by precise movement of a valve member (e.g., a valve plug). The control valve (e.g., a sliding valve stem valve) may include a valve stem connected via threads to the valve plug at a threaded opening of the valve plug so that the valve stem is oriented substantially perpendicular to the valve plug. The valve stem may be fixed non-rotatably to the valve plug by welding together the valve stem and valve plug. However, the valve stem and valve plug cannot be welded together if either the valve stem or the valve plug are made of a non-weldable material, or if the filler material is incompatible with the base material of the valve stem or the valve plug. Alternatively, the valve stem may be secured non-rotatably to the valve plug by using a drive pin. However, connecting the valve stem to the valve plug by using a drive pin can cause misalignment between the valve stem and the valve plug and affect the integrity of the valve plug.

FIG. 1 is a partially cut-away schematic illustration of a known sliding valve stem assembly 100. An actuator 110 is coupled to a valve stem 140 that extends into a valve assembly 170. FIG. 2 is an enlarged illustration of a portion of the valve assembly 170 of FIG. 1, including the valve stem 140. As more clearly shown in FIG. 2, an end 148 of the valve stem 140 has threads 143 and an angled opening 146. The valve assembly 170 has an inlet 172 communicating with a valve orifice 174 and an outlet 176. Fluid flow through the valve orifice 174 is controlled by a valve member or valve plug 180. The valve plug 180 includes a central through opening 182 with threads 183, valve plug holes 184, and a counter bore 186 that extends at an angle from a valve surface 185 toward a valve surface 187. The threads 143 at the end 148 of the valve stem 140 are received by the threads 183 of the valve plug 180. As can be readily seen in FIG. 2, a pin 190, which is slightly larger in diameter than the counter bore 186, is located in the counter bore 186 of the valve plug 180 and the angled opening 146 of the valve stem 140.

The valve stem 140 is coupled to the valve plug 180 by threading the threads 143 into the threads 183 at the central through opening 182 to position the valve stem 140 substantially perpendicular to the valve plug 180. After the valve stem 140 has been threaded tightly into the through opening 182, the counter bore 186 is drilled into the valve plug 180 and the opening 146 is drilled into the end 148 of the valve stem 140. The pin 190 is then press-fitted into the counter bore 186 and the opening 146 to secure the valve stem 140 to the valve plug 180 to prevent the valve plug 180 from rotating relative to the valve stem 140 (i.e., non-rotatability). The valve stem 140 has solid contact alignment at the engagement of the upper most threads 143 with the upper most threads 183 in the central through opening 182. However, the engagement of the pin 190 with the end 148 of the valve stem 140 is near the valve surface 187. The force of the press fitting of the pin 190 into the valve stem 140 can result in the valve stem 140 being positioned at a non-perpendicular angle (e.g., misaligned) relative to the valve plug 180. The non-perpendicular misalignment of the valve stem 140 relative to the valve plug 180 can affect the integrity of the coupling of the valve plug 180 to the valve stem 140.

SUMMARY

An apparatus connects a valve stem to a valve plug, and comprises the valve plug having an opening with an interior surface, the valve stem having an exterior surface, and at least one of the surfaces having a recess and the other of the surfaces having a protrusion to be received by the recess of the one surface. An adjacent opening extends from at least one of the opening of the valve plug or the exterior surface of the valve stem, and a securement member is received in the adjacent opening to secure together nonrotatably the valve stem and the valve plug.

DETAILED DESCRIPTION

In general, the example apparatus to connect a valve stem to a valve plug described herein may be utilized for connections between parts in various types of assemblies or devices. Additionally, while the examples disclosed herein are described in connection with the control of product flow for the processing industry, the examples described herein may be more generally applicable to a variety of control operations for different purposes.

Figure 1:
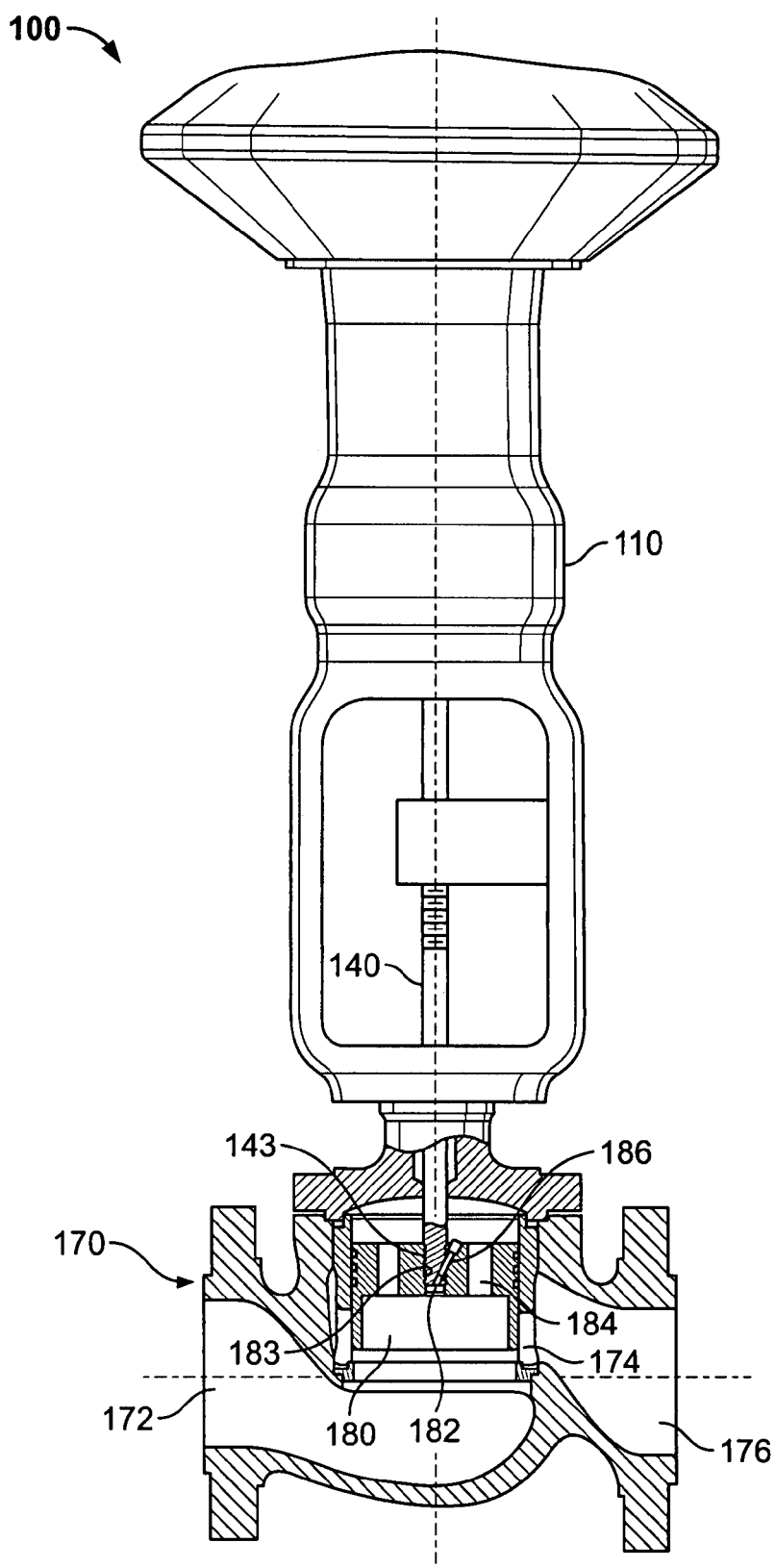
FIG. 1 is a partially cut-away schematic illustration of a known sliding valve stem valve assembly.
Figure 2:
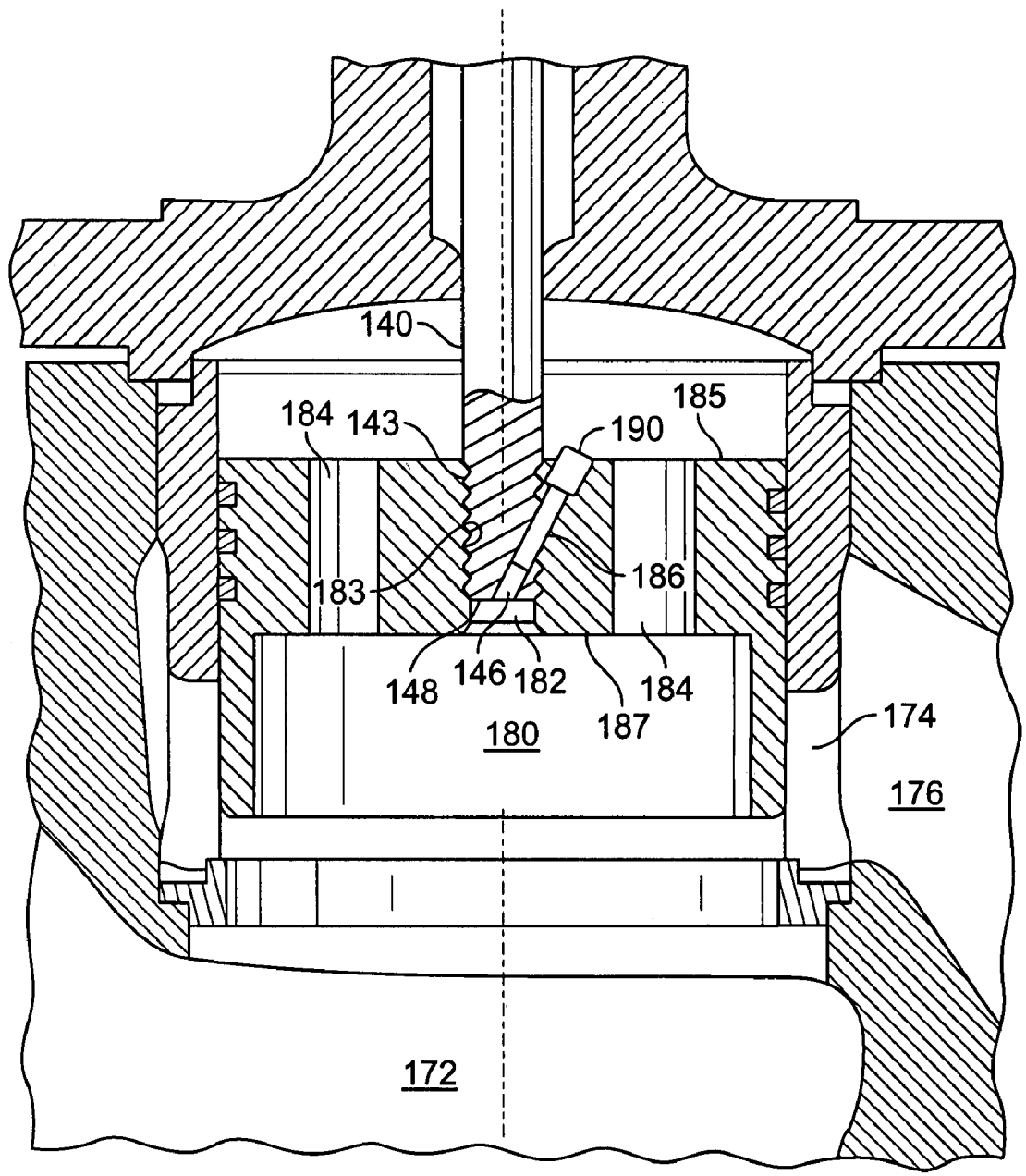
FIG. 2 is an enlarged illustration of a portion of the valve assembly in FIG. 1.
Figure 3:
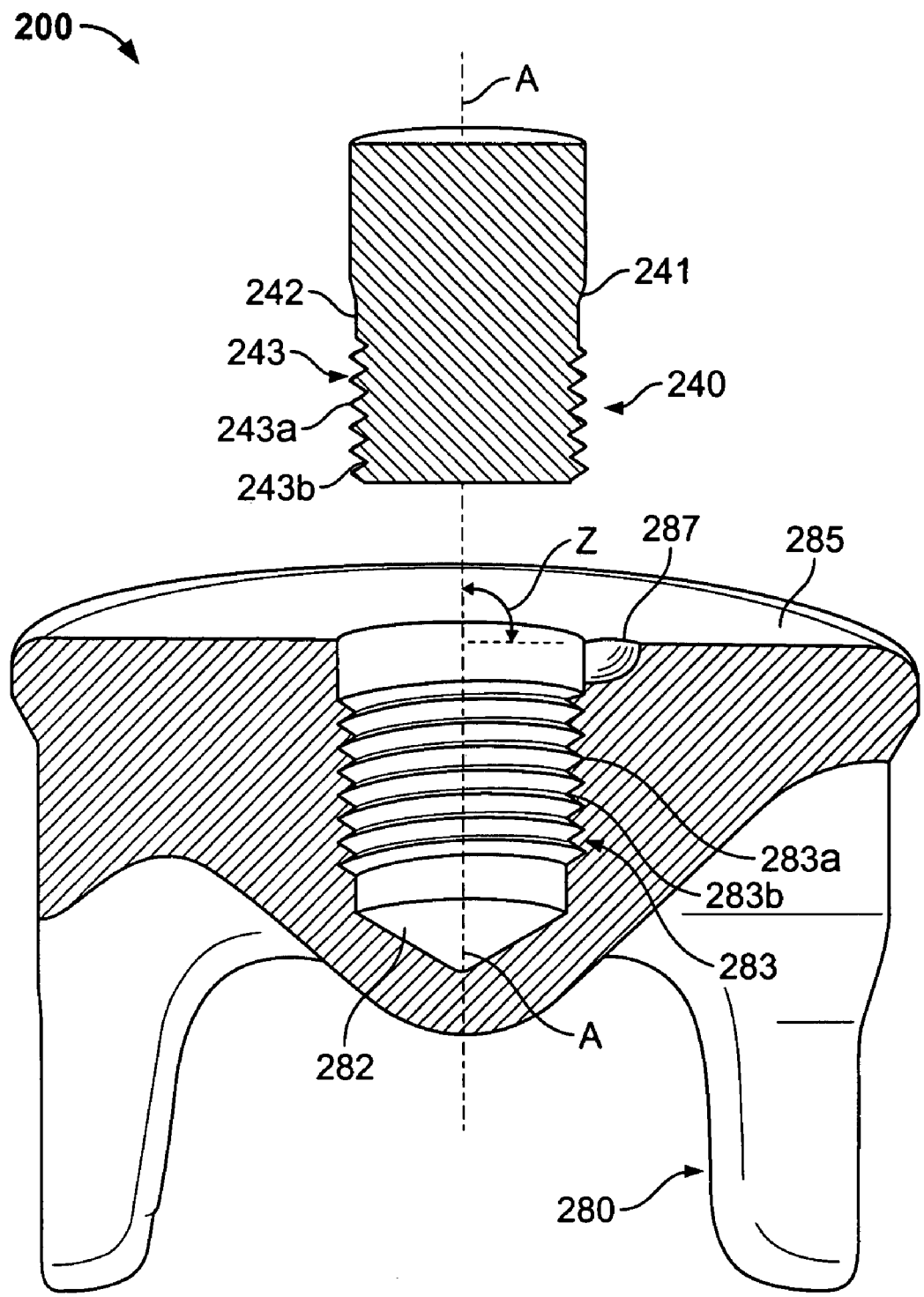
FIG. 3 is a partial illustration of an example apparatus to connect a valve stem to a valve plug.

FIG. 3 is an illustration of an example apparatus 200 to connect a valve stem 240 to a valve plug 280. Some elements of the example apparatus 200 are substantially the same as elements shown and described in connection with the FIGS. 1 and 2. Thus, in the interest of brevity, the description of the elements that are the same as the elements in FIGS. 1 and 2 will not be repeated. Instead, the interested reader is referred back to the corresponding description of FIGS. 1 and 2. To facilitate this process, similar elements in FIGS. 3 and 4 have been numbered with reference numerals increased by 100 above the corresponding elements in FIGS. 1 and 2.

Figure 4:
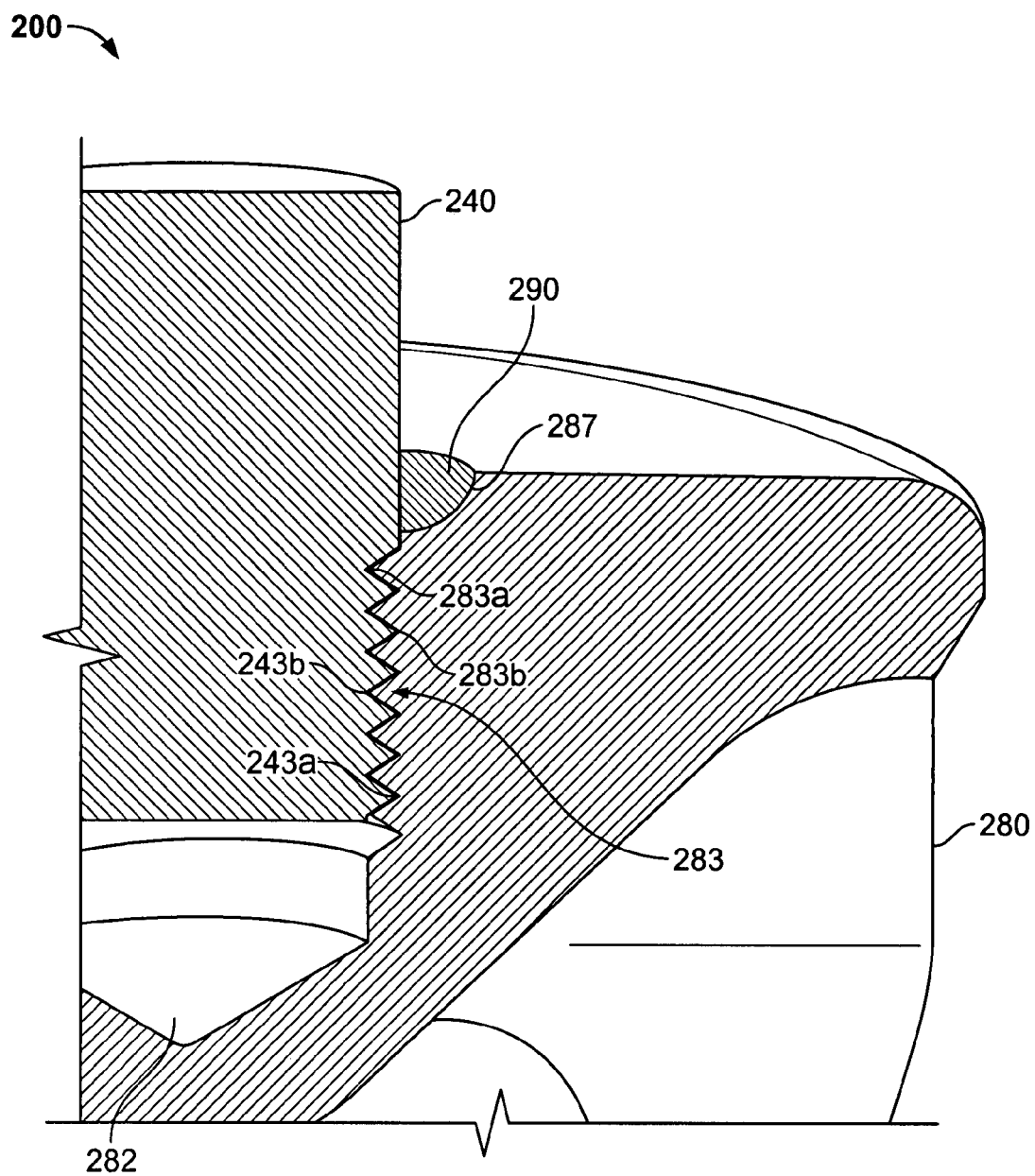
FIG. 4 is an enlarged view of the example apparatus illustrated in FIG. 3.

In FIGS. 3 and 4, the valve stem 240 is made of a weldable material such as, for example, 316 strain-hardened stainless steel and includes threads 243 located about an exterior surface 241 of an end 242 of the valve stem 240. The threads 243 comprise a series of radially extending protrusions 243*a* and recesses 243*b* at the end 242 of the valve stem 240. The valve stem 240 has a longitudinal centerline or axis A-A. The valve plug 280 is made of a non-weldable cast material such as, for example, Monel®. The valve plug 280 includes a central opening 282 extending from a surface 285 and having therein threads 283. The threads 283 comprise a series of radially extending protrusions 283a and recesses 283b within the central opening 282 of the valve plug 280. An adjacent opening 287 extends laterally from central opening 282 and away from the surface 285. The adjacent opening 287 may be milled into the valve plug 280 or formed when the valve plug 280 is cast.

To assemble the example apparatus 200, the valve stem 240 is coupled to the valve plug 280 by threading the threads 243 into the threads 283 of the central opening 282, such that the protrusions 243a are received in the recesses 283b and the protrusions 283a are received in the recesses 243b. As shown in FIGS. 3 and 4, the valve stem 240 is positioned for entry into and threaded or seated within the central opening 282 such that the surface 285 is substantially perpendicular to the longitudinal axis A-A of the valve stem 240 (e.g., see angle Z in FIG. 3). After the threads 243 of valve stem 240 have been threaded into the threads 283 of the central opening 282, a securement member or weld 290 is made at the valve stem 240 and within the adjacent opening 287 (see FIG. 4). The valve stem 240 is made of a weldable material so that the weld 290 attaches to the valve stem 240 and extends into the adjacent opening 287. The reception of the weld 290 within the adjacent opening 287 prevents the valve stem 240 from rotating relative to the valve plug 280. Thus, the weld 290 secures together non-rotatably the valve stem 240 and the valve plug 280.

The weld 290 enables the valve stem 240 to be positioned substantially perpendicular, or orthogonal, to and coaxially aligned with the valve plug 280. Thus, the weld 290 does not result in a misalignment between the valve stem 240 and the valve plug 280. Additionally, the reception of the weld 290 within the adjacent opening 287 enables the weld 290 to be located substantially below the surface 285 of the valve plug 280 to prevent the weld 290 from engaging other parts of the example apparatus 200 or affecting fluid flow.

Figure 5:
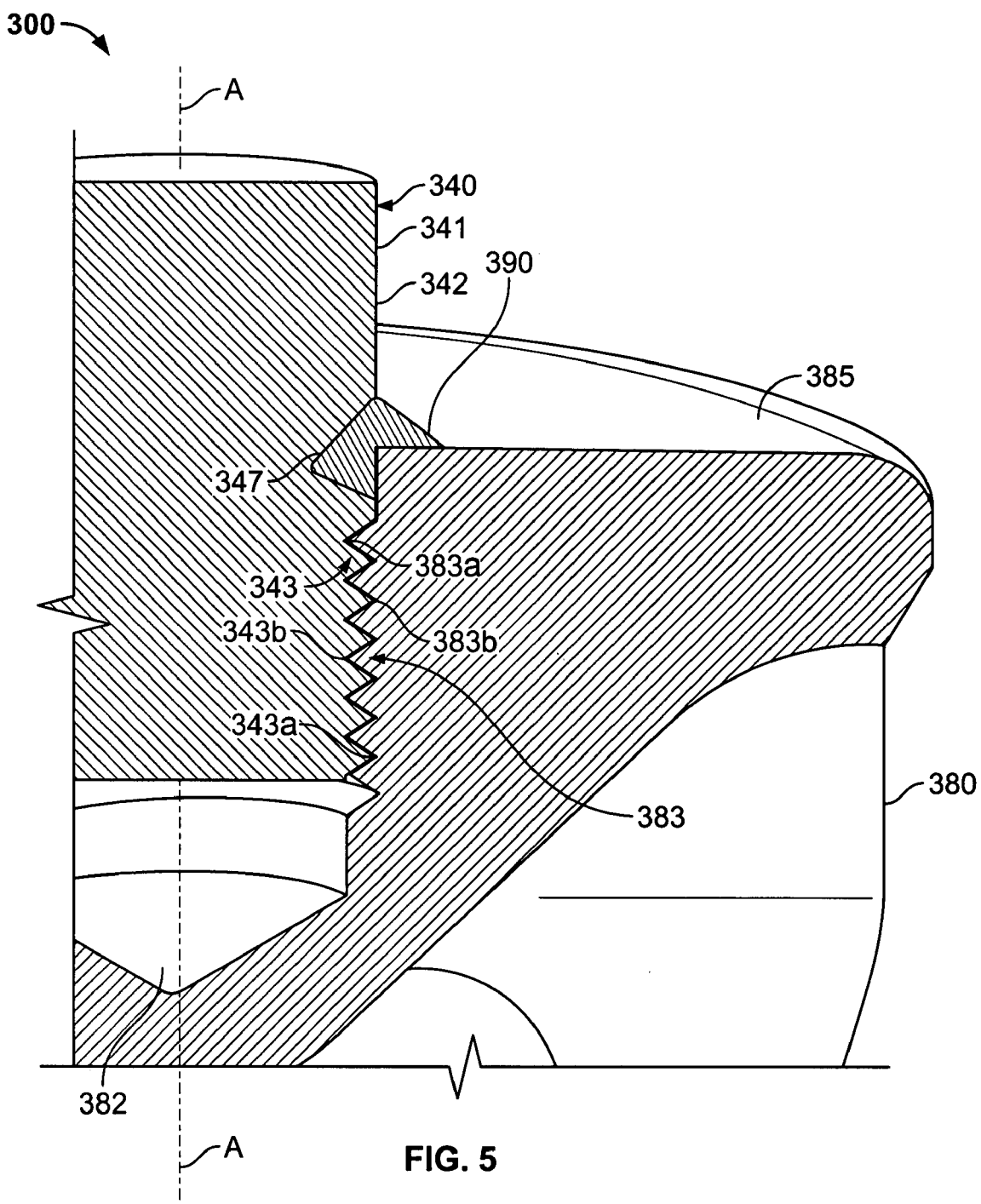
FIG. 5 is a partial illustration of another example apparatus to connect a valve stem to a valve plug.

FIG. 5 is a partial illustration of another example apparatus 300 to connect a valve stem to a valve plug. Some elements of the example apparatus 300 are substantially the same as elements shown and described in connection with the FIGS. 1-4. Thus, in the interest of brevity, the description of the elements that are the same as the elements in FIGS. 1-4 will not be repeated. Instead, the interested reader is referred back to the corresponding description of FIGS. 1-4. To facilitate this process, similar elements in FIG. 5 have been numbered with reference numerals in the 300's relative to the corresponding elements in FIGS. 1-4.

In FIG. 5, the valve stem 340 is made of a non-weldable material and the valve plug 380 is made of a weldable material. The valve stem 340 includes threads 343 located about an exterior surface 341 of an end 342 of the valve stem 340. The threads 343 comprise a series of radially extending protrusions 343a and recesses 343b at the end 342 of the valve stem 340. An adjacent opening 347 extends laterally from exterior surface 341. The adjacent opening 347 may be milled into the valve stem 340 or, if the valve stem 340 is cast, formed when the valve stem 340 is cast. The valve stem 340 has a longitudinal centerline or axis A-A. The valve plug 380 includes a central opening 382 extending from a surface 385 and having therein threads 383. The threads 383 comprise a series of radially extending protrusions 383a and recesses 383b within the central opening 382 of the valve plug 380.

To assemble the example apparatus 300, the valve stem 340 is coupled to the valve plug 380 by threading the threads 343 into the threads 383 of the central opening 382, such that the protrusions 343a are received in the recesses 383b and the protrusions 383a are received in the recesses 343b. As shown in FIG. 5, the valve stem 340 is threaded or seated within the central opening 382 such that the surface 385 is substantially perpendicular to the longitudinal axis A-A of the valve stem 340. After the threads 343 of valve stem 340 have been threaded into the threads 383 of the central opening 382, a securement member or weld 390 is made at the adjacent opening 347 of the valve stem 340. The valve plug 380 is made of a weldable material so that the weld 390 attaches to the valve plug 380 and extends into the adjacent opening 347. The reception of the weld 390 within the adjacent opening 347 prevents the valve stem 340 from rotating relative to the valve plug 380. Thus, the weld 390 secures together non-rotatably the valve stem 340 and the valve plug 380.

The weld 390 enables the valve stem 340 to be positioned substantially perpendicular, or orthogonal, to and coaxially aligned with the valve plug 380. Thus, the weld 390 does not result in a misalignment between the valve stem 340 and the valve plug 380.

It should be appreciated by one of ordinary skill in the art that the quality and nature of a weld is generally dependent upon the combination of the base materials and the filler material. Thus, while the above-described examples disclose the securement of a weldable valve stem 240 to a non-weldable valve plug 280 and the securement of a weldable valve plug 380 to a non-weldable valve stem 340, this disclosure also includes the securement of a weldable valve stem to a weldable valve plug wherein a base material of either the weldable stem or weldable valve plug is substantially incompatible relative to a specific filler material and/or welding process. In other words, the valve stem or the valve plug each may be made of a weldable base material if certain fillers and/or welding processes are used. However, the weldable valve stem and/or weldable valve plug may not be compatible with other specific filler materials and/or welding processes and thereby prevent the coalescing or alloying of their base material(s).

Although certain example apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. Apparatus to connect a valve stem to a valve plug, comprising:
   a valve plug having a threaded opening;
   a valve stem having threads about an exterior surface, the threads to be received by the threaded opening of the valve plug;
   an adjacent opening extending from at least one of the threaded opening or the exterior surface; and
   a securement member to be received in the adjacent opening to secure together nonrotatably the valve stem and the valve plug, wherein the securement member and the adjacent opening are configured to substantially prevent misalignment of the valve stem and the valve plug when the securement member is disposed in the adjacent opening, and wherein one of the valve plug or the valve stem is made of a non-weldable material and the other one of the valve plug or the valve stem is made of a weldable material.

2. Apparatus as defined in claim 1, wherein the valve plug is made of a non-weldable material.

3. Apparatus as defined in claim 1, wherein the securement member is attached to the valve stem via a weld.

4. Apparatus as defined in claim 1, wherein the adjacent opening is milled in the valve plug.

5. Apparatus as defined in claim 1, wherein the adjacent opening is milled in the valve stem.

6. Apparatus as defined in claim 1, wherein the valve stem has a longitudinal axis and the valve plug has a surface disposed substantially orthogonal to the longitudinal axis of the valve stem, and wherein the adjacent opening is disposed in the surface to provide accessibility to a portion of the valve stem located beyond the surface.

7. Apparatus as defined in claim 1, wherein the securement member is attached to the valve plug via a weld.

8. Apparatus as defined in claim 1, wherein the securement member is made of a material that is non-weldable to at least one of the valve stem or the valve member.

9. Apparatus as defined in claim 1, wherein the securement member enables the valve stem to be positioned substantially perpendicular to and substantially coaxially aligned with the valve plug when the valve stem is coupled to the valve plug.

10. Apparatus to connect a valve stem to a valve plug, comprising:
 a valve plug having an opening with an interior surface;
 a valve stem having an exterior surface;
 an adjacent opening extending from at least one of the opening of the valve plug or the exterior surface of the valve stem; and
 a weld to be received in the adjacent opening to secure together nonrotatably the valve stem and the valve plug, wherein the weld enables the valve stem to be substantially aligned the valve plug when the valve stem is coupled to the valve plug, and wherein the weld is made of a material that is non-weldable to at least one of the valve stem or the valve plug.

11. Apparatus as defined in claim 10, wherein the valve plug is made of a non-weldable material.

12. Apparatus as defined in claim 10, wherein the weld is attached to the valve stem.

13. Apparatus as defined in claim 10, wherein the adjacent opening is milled in the valve plug.

14. Apparatus as defined in claim 13, wherein the valve stem has a longitudinal axis and the valve plug has a surface disposed substantially orthogonal to the longitudinal axis of the valve stem, and wherein the adjacent opening is disposed in the surface to provide accessibility to a portion of the valve stem located in the opening.

15. Apparatus as defined in claim 10, wherein the weld is attached to the valve stem or the valve plug.

16. Apparatus as defined in claim 10, wherein the valve stem is made of a non-weldable material.

17. Apparatus as defined in claim 10, wherein the weld is attached to the valve plug.

18. Apparatus as defined in claim 10, wherein the adjacent opening is milled in the valve stem.

19. Apparatus as defined in claim 10, wherein at least one of the surfaces has a recess and the other of the surfaces has a protrusion to be received by the recess of the one surface.

\* \* \* \* \*